(12) United States Patent
Tamayo

(10) Patent No.: US 12,519,862 B2
(45) Date of Patent: Jan. 6, 2026

(54) ENHANCED DATA PRIVACY AND RECOMMENDATIONS

(71) Applicant: Capital One Services, LLC, McLean, VA (US)

(72) Inventor: Bryan Tamayo, Allen, TX (US)

(73) Assignee: Capital One Services, LLC, McLean, VA (US)

(*) Notice: Subject to any disclaimer, the term of this patent is extended or adjusted under 35 U.S.C. 154(b) by 334 days.

(21) Appl. No.: 18/452,238

(22) Filed: Aug. 18, 2023

(65) Prior Publication Data

US 2025/0063023 A1 Feb. 20, 2025

(51) Int. Cl.
| | |
|---|---|
| G06F 15/16 | (2006.01) |
| G06Q 30/0201 | (2023.01) |
| G06Q 30/0203 | (2023.01) |
| H04L 67/1396 | (2022.01) |
| H04L 67/306 | (2022.01) |
| H04L 67/50 | (2022.01) |

(52) U.S. Cl.
CPC ....... H04L 67/306 (2013.01); G06Q 30/0201 (2013.01); G06Q 30/0203 (2013.01); H04L 67/1396 (2022.05); H04L 67/535 (2022.05)

(58) Field of Classification Search
CPC . H04L 67/306; H04L 67/1396; H04L 67/535; G06Q 30/0201; G06Q 30/0203
USPC ........................................................ 709/203
See application file for complete search history.

(56) References Cited

U.S. PATENT DOCUMENTS

| | | | | |
|---|---|---|---|---|
| 11,636,527 | B2 * | 4/2023 | Shahul Hamid ... | G06Q 30/0631 705/26.7 |
| 12,407,523 | B2 * | 9/2025 | Turner .................. | H04L 9/3297 |
| 2012/0202183 | A1 | 8/2012 | Meagor et al. | |
| 2012/0297017 | A1 * | 11/2012 | Livshits ............. | G06Q 30/0241 709/217 |
| 2014/0214919 | A1 * | 7/2014 | Taylor .................. | H04L 67/563 709/203 |
| 2017/0308925 | A1 * | 10/2017 | Schneider ........ | H04N 21/25866 |
| 2023/0306352 | A1 * | 9/2023 | Kim ................. | G06Q 10/06398 |
| 2024/0127375 | A1 * | 4/2024 | Watts ................. | G06Q 30/0609 |
| 2024/0241915 | A1 * | 7/2024 | Sankararaman .... | G06F 16/9535 |
| 2024/0281460 | A1 * | 8/2024 | Abbasi .................. | G06F 16/435 |
| 2025/0104106 | A1 * | 3/2025 | Manova ............. | G06Q 30/0251 |

* cited by examiner

*Primary Examiner* — Alan S Chou
(74) *Attorney, Agent, or Firm* — Harrity & Harrity, LLP

(57) ABSTRACT

In some implementations, a device may obtain, via a navigation platform, data indicating a first one or more responses to a questionnaire. The device may establish, based on obtaining the data, a private session associated with managing the data. The device may determine, based on the data, one or more recommended resources, from a set of resources, that indicate relevant content based on the first one or more responses. The device may provide, via the private session, the one or more recommended resources. The device may obtain, via the private session, interaction information associated with one or more interactions with the one or more recommended resources that occur via the navigation platform. The device may anonymize the data and the interaction information to generate response data that is in response to the questionnaire. The device may provide, to a server device, the response data.

20 Claims, 8 Drawing Sheets

ENHANCED DATA PRIVACY AND RECOMMENDATIONS

BACKGROUND

Data analytics involves using data to discover useful information, inform conclusions, and/or support decision-making. For example, an entity may collect data and use data analytics to monitor one or more functions of the entity, make decisions, and/or make recommendations, among other examples. Information privacy is the relationship between the collection and dissemination of data, technology, the public expectation of privacy, and contextual information norms. Data privacy may be challenging to ensure because an entity may attempt to use or analyze data associated with an individual while also protecting an individual's privacy preferences and personally identifiable information.

SUMMARY

Some implementations described herein relate to a system for providing data privacy and recommendations. The system may include one or more memories and one or more processors communicatively coupled to the one or more memories. The one or more processors may be configured to obtain, via a private browser, user data indicating a first one or more responses. The one or more processors may be configured to establish, based on obtaining the user data, a private session associated with managing the user data, wherein the private session is identified using an identifier of the private browser, and wherein browsing data associated with the private session is locally stored via the private browser. The one or more processors may be configured to determine, based on the user data, one or more recommended resources that indicate relevant content that is based on the first one or more responses. The one or more processors may be configured to provide, via the private session, access to the one or more recommended resources. The one or more processors may be configured to obtain, via the private session, interaction information associated with one or more interactions with the one or more recommended resources via the private browser. The one or more processors may be configured to generate response data that indicates the user data and the interaction information, wherein the response data is anonymized. The one or more processors may be configured to provide, to a server device and via another session, the response data.

Some implementations described herein relate to a method for providing data privacy and recommendations. The method may include obtaining, by a device and via a navigation platform, data indicating a first one or more responses to a questionnaire. The method may include establishing, by the device and based on obtaining the data, a private session associated with managing the data, wherein the private session is identified using an identifier of the navigation platform. The method may include determining, by the device and based on the data, one or more recommended resources, from a set of resources, that indicate relevant content based on the first one or more responses. The method may include providing, by the device and via the private session, the one or more recommended resources. The method may include obtaining, by the device and via the private session, interaction information associated with one or more interactions with the one or more recommended resources that occur via the navigation platform. The method may include anonymizing, by the device, the data and the interaction information to generate response data that is in response to the questionnaire. The method may include providing, by the device and to a server device, the response data.

Some implementations described herein relate to a non-transitory computer-readable medium that stores a set of instructions. The set of instructions, when executed by one or more processors of a user device, may cause the user device to provide, for display, a questionnaire page of a user interface associated with a questionnaire, wherein the user interface is displayed via a browser executing on the user device. The set of instructions, when executed by one or more processors of the user device, may cause the user device to obtain, via the user interface, data indicating one or more responses to the questionnaire. The set of instructions, when executed by one or more processors of the user device, may cause the user device to store, via browser storage, the data associated with a private session of the browser. The set of instructions, when executed by one or more processors of the user device, may cause the user device to provide, via the private session and to a recommendation device, an indication of the data. The set of instructions, when executed by one or more processors of the user device, may cause the user device to receive, via the private session, one or more recommended resources that are based on the data. The set of instructions, when executed by one or more processors of the user device, may cause the user device to obtain, via the user interface, user interaction information associated with interactions to the one or more recommended resources. The set of instructions, when executed by one or more processors of the user device, may cause the user device to provide, via the private session and to the recommendation device, the interaction information.

DETAILED DESCRIPTION

Figure 1A:
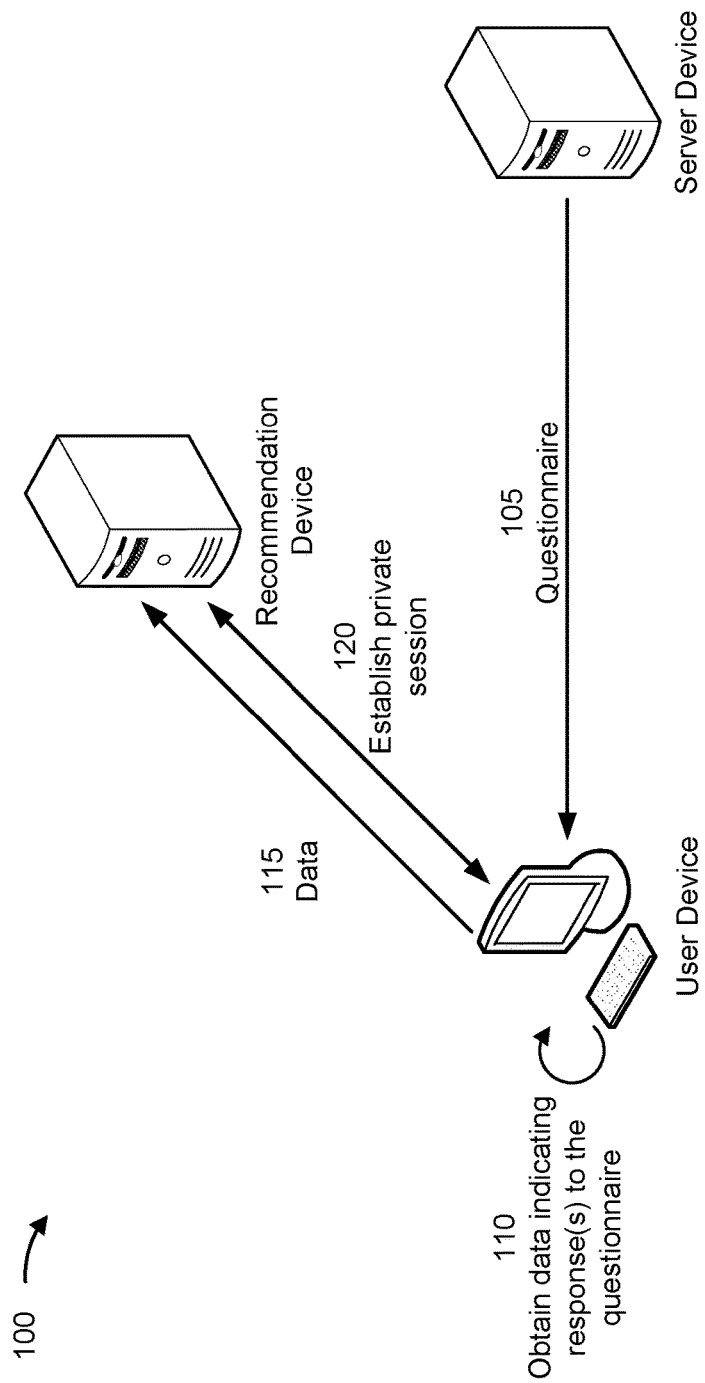
FIGS. 1A-1D are diagrams of an example associated with enhanced data privacy and recommendations, in accordance with some embodiments of the present disclosure.

The following detailed description of example implementations refers to the accompanying drawings. The same reference numbers in different drawings may identify the same or similar elements.

An entity may collect data and use data analytics to monitor one or more functions of the entity, to evaluate performance of the entity in one or more areas, and/or to evaluate workplace satisfaction, among other examples. For example, an entity may use data analytics to evaluate the entity's performance with respect to customer service, customer experience, employee satisfaction, and/or workplace satisfaction, among other examples. The entity may use the data analytics to identify one or more areas for improvement (e.g., one or more areas where the performance of the entity is poor or below average). For example, the data analytics may indicate that improving a customer experience may lead to better customer engagement, thereby improving business performance (e.g., financial performance) of the entity.

In some examples, the entity may use a questionnaire to collect the data. A questionnaire may also be referred to as a survey, one or more questions, a poll, a sampling, and/or an inquiry, among other examples. For example, a user may respond to one or more questions or prompts indicated by the questionnaire. The responses may be indicated in data (e.g., response data). The response data may be anonymized (e.g., to protect the privacy of the user providing the responses). A device may collect response data from multiple users and perform data analytics to identify one or more areas to be addressed (e.g., for an entity or a team within the entity). For example, the device may provide an indication of the one or more areas to be addressed. The entity may provide resources, training, education, and/or make one or more changes based on the indicated areas to be addressed.

However, because the response data may be anonymized, the one or more areas to be addressed may be general for multiple users (e.g., for employees of an entity or employees in a team of an entity). As a result, the one or more areas to be addressed may not be relevant for all users included in the multiple users. Therefore, computing resources, processing resources, memory resources, and/or time, among other examples, may be consumed to collect response data, analyze the response data, determine the one or more areas to be addressed, and/or perform one or more actions to address the one or more areas, among other examples, where the one or more areas to be addressed are not relevant for some users. However, it may be difficult to determine personalized area(s) to be addressed for a user while also maintaining privacy and security of response data for the user. For example, the response data associated with a user may be analyzed to determine personalized area(s) to be addressed for the user (e.g., where the response data is not anonymized). However, this introduces privacy and security risks associated with the response data because the response data may be explicitly tied to the user. Additionally, this may reduce a likelihood that the user provides truthful, complete, and/or otherwise accurate responses because the user may not wish to have their responses be directly tied to the user (e.g., where the response data is not anonymized before being analyzed).

Some implementations described herein enable enhanced data privacy and recommendations. For example, the response data (e.g., user data) may be analyzed and/or managed in a private session. A "private session" may refer to a restricted and/or isolated browsing or computer environment that is designed to keep the user's activity and data separate from a main or default session. For example, during the private session, a device (e.g., a user device) may create a temporary and/or isolated workspace where browsing history, cookies, cached files, and/or other temporary data are not stored or retained after the private session is ended. As an example, a user device may obtain data (e.g., user data) indicating one or more responses (e.g., to a questionnaire) via a private session. The user device may provide, to a recommendation device, an indication of the data via the private session. The recommendation device may determine, based on the data, one or more recommended resources that indicate relevant content that is based on the one or more responses indicated by the data. The recommendation device may provide, and the user device may enable, access to the one or more recommended resources via the private session.

In some implementations, the user device may obtain, via the private session, interaction information associated with one or more interactions with the one or more recommended resources. The user device and/or the recommendation device may generate response data that indicates the user data and the interaction information. The response data may be anonymized. For example, the user device and/or the recommendation device may perform one or more actions to anonymize the response data. The user device and/or the recommendation device may provide the response data to a server device (e.g., via another session other than the private session).

As a result, personalized resources may be provided to the user device in response to the user data (e.g., indicating one or more responses to a questionnaire) while also ensuring the privacy of the user data. For example, all browsing history, cookies, cached files, and/or other temporary data associated with the private session may be stored locally (e.g., in a browser memory) by the user device. After the private session is ended, the browsing history, cookies, cached files, and/or other temporary data associated with the private session may be deleted. Additionally, by providing access to the one or more resources via the private session in response to the user data, personalized resources may be displayed for a user shortly after the user provides the one or more responses. This improves access to relevant content for the user and reduces an amount of time between the user providing the one or more responses and obtaining access to the one or more resources. Additionally, be enabling the recommendation device to provide the one or more resources via the private session in response to the user data, the recommendation device may conserve computing resources, processing resources, memory resources, and/or time, among other examples, that would have otherwise been used to collect anonymized response data, analyze the response data, determine one or more areas to be addressed, and/or perform one or more actions to address the one or more areas (e.g., to provide access to resource(s) associated with the one or more areas, among other examples, where the one or more areas are not relevant for the user).

FIGS. 1A-1D are diagrams of an example 100 associated with enhanced data privacy and recommendations. As shown in FIGS. 1A-1D, example 100 includes a user device, a recommendation device, and a server device. These devices are described in more detail in connection with FIGS. 2 and 3.

As shown in FIG. 1A, and by reference number 105, the server device may provide, and the user device may obtain, a questionnaire. The questionnaire may indicate one or more questions and/or one or more prompts. The server device may provide display information that causes the user device to display the one or more questions and/or one or more prompts. For example, the user device may display a user interface that indicates the one or more questions and/or one or more prompts associated with the questionnaire. The user interface may include one or more fields or input options for providing responses for respective questions or prompts associated with the questionnaire.

The questionnaire may be provided by an entity and/or a team associated with an entity. For example, the questionnaire may be an employee questionnaire requesting feedback on workplace conditions. As another example, the questionnaire may be a customer experience questionnaire (e.g., requesting feedback on a customer experience). The questionnaire may be associated with any topic and/or area for which information is requested from one or more users.

As shown by reference number 110, the user device may obtain data (e.g., user data) indicating one or more responses to the questionnaire. For example, the user device may obtain one or more inputs to a user interface (e.g., via a questionnaire page of the user interface that is associated with displaying the questionnaire). The one or more inputs may indicate the one or more responses. The user device may collect the one or more responses to generate the user data. In some implementations, the user device may obtain the one or more responses via a private session, as described in more detail elsewhere herein. For example, the user device may establish the private session as part of displaying the user interface. The user device may obtain, via a browser or application associated with the private session, the one or more responses to the questionnaire. In other examples, the user device may obtain the one or more responses via another session (e.g., other than the private session). In such examples, the user device may establish the private session after obtaining the user data.

As shown by reference number 115, the user device may provide, and the recommendation device may obtain, the data (e.g., the user data indicating the one or more responses). In some implementations, the user device may provide the user data via the private session. In some implementations, the user device may provide an indication that the user device has obtained the user data (e.g., rather than providing the actual user data).

As shown by reference number 120, the user device and/or the recommendation device may establish a private session. As described elsewhere herein, the private session may be a restricted and/or isolated browsing or computer environment that is designed to keep the user's activity and data separate from a main or default session. For example, the private session may be associated with a navigation platform (e.g., a browser, a web browser, an application, or another navigation platform). For example, although some implementations are described herein using a browser as an example navigation platform, the techniques and implementations described herein may be similarly applied for any navigation platform.

In some implementations, the navigation platform may be a private navigation platform. For example, the navigation platform may include one or more security features associated with increasing privacy and/or security of data obtained or generated via the navigation platform. In some implementations, the private navigation platform may be a private browser. For example, a private browser may be associated with reduced browser history storage, reduced temporary file generation (e.g., generating and/or storing no or limited cookies), reduced or no data storage, blocked third-party tracking, and/or a secure connection (e.g., using one or more encryption protocols), among other examples.

The private session may enable secure communications between the user device and the recommendation device. For example, the private session may be associated with an encryption protocol, such as end-to-end (E2E) encryption, and/or hypertext transfer protocol secure (HTTPS) encryption, among other examples. Additionally, the private session may be associated with local storage associated with the user device (e.g., and no storage at or on the recommendation device).

For example, the user data, browsing history, interaction information, and/or any other data generated, obtained, and/or communicated via the private session may be stored locally on and/or by the user device. For example, the user device may store the user data, browsing history, interaction information, and/or any other data generated, obtained, and/or communicated via the private session via temporary storage associated with the navigation platform. In other words, the data, the interaction information, and any browsing data generated via the private session are stored locally (e.g., by the user device) via the navigation platform. As an example, the user device may store user data, browsing history, interaction information, and/or any other data generated, obtained, and/or communicated via the private session via private and/or temporary browser storage (e.g., local storage or web storage). The local storage of data associated with the private session may ensure anonymity and privacy of the collected data because the data is not stored in a device (such as the server device) where the data may be associated with, or attributed to, the user. In other words, the local storage of data associated with the private session may ensure anonymity and privacy of collected response(s) and any interactions with resources provided in response to the response(s), as described in more detail elsewhere herein.

In some implementations, the recommendation device and/or the user device may manage multiple private sessions for the same user. For example, the recommendation device and/or the user device may establish multiple private sessions associated with respective questionnaires including the questionnaire. The multiple private sessions may be associated with separately maintaining respective data for the respective questionnaires. For example, data (e.g., user data, browsing history, interaction information, and/or any other data generated, obtained, and/or communicated via the private session) may be separately stored and/or maintained for each private session. This may enable multiple private sessions to be accessed by a user at a given time (e.g., allowing the user to revisit previous private sessions and/or initiate a new session). For example, the user device may obtain, via the navigation platform, an indication to save a private session. The user device and/or the navigation platform may maintain any data associated with the private session (e.g., in local and/or temporary storage, as described elsewhere herein) to enable the private session to be visited and/or activated at a later time.

The user device and the recommendation device may communicate via an application programming interface (API) associated with the private session and/or the navigation platform. In some implementations, the recommendation device may identify and/or generate an identifier associated with the private session. The identifier may be based on an identifier of the navigation platform. For example, the private session may be identified using an identifier of the private browser. This may enable the recommendation device to identify the private session and/or the user data without storing and/or obtaining information that actually identifies the user (e.g., the user that provided the one or more responses to generate the user data).

Figure 1B:
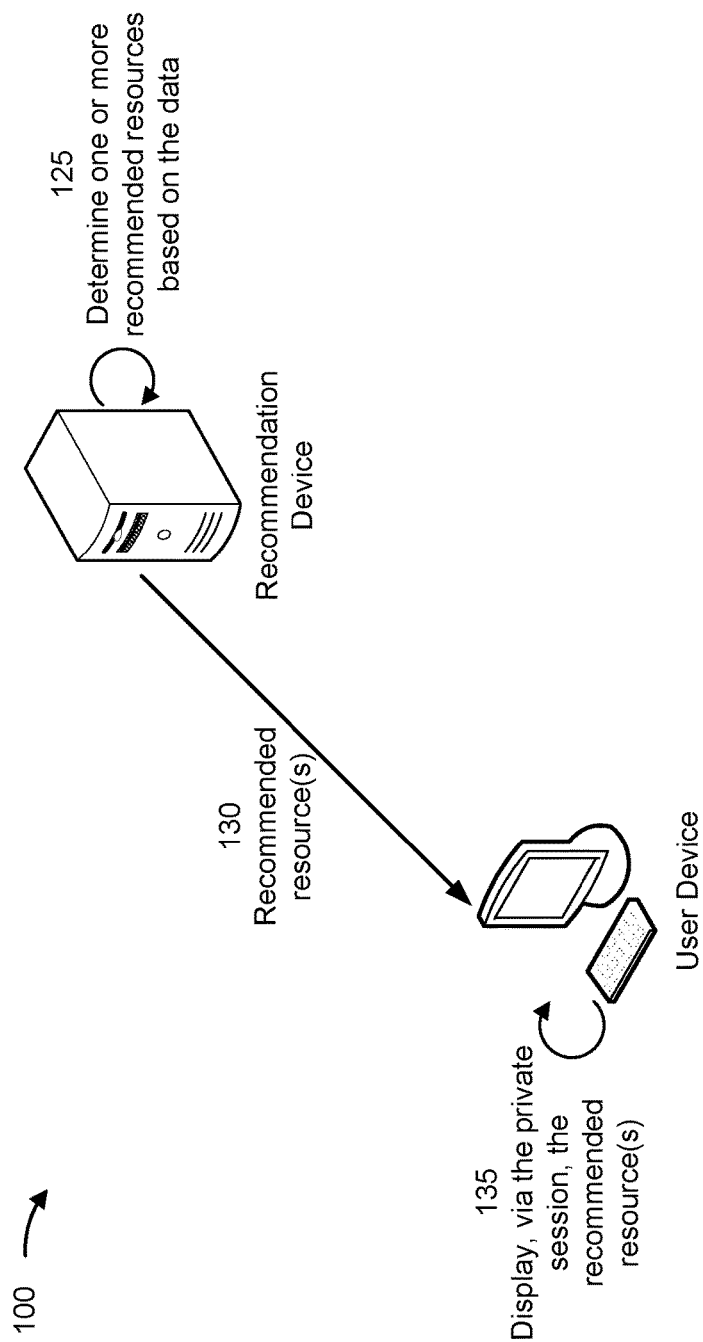

As shown in FIG. 1B, and by reference number 125, the recommendation device may determine, based on the user data, one or more recommended resources that indicate relevant content that is based on the one or more responses obtained by the user device. For example, the recommendation device may store a set of resources. As used herein, a "resource" in the context of resources that indicate content to be provided to the user may refer to a web page, an article, a message, contact information (e.g., a website, a phone number, an email address, or other contact information), training content, a user interface, a video, an indication of one or more recommended actions (e.g., a series of "next steps"), and/or another type of resource that indicates content.

The recommendation device may store a library of resources. The library of resources may include resources associated with and/or provided by an entity (e.g., the entity that provided and/or is associated with the questionnaire). In some implementations, each resource may be associated with one or more topics or areas. For example, the recommendation device may store the set of resources and an indication of one or more topics or areas associated with each resource. This enables the recommendation device to identify appropriate resources to be recommended based on user data that is generated based on response(s) to the questionnaire, as described in more detail elsewhere herein. Additionally, this may reduce an amount of time between questionnaire response(s) being provided by a user and the resource(s) being provided to the user.

The recommendation device may analyze the user data to determine one or more topics or areas that may be of interest to the user. For example, the recommendation device may determine, using a machine learning model, one or more content indicators associated with the user based on the one or more responses. A content indicator may be an identifier of a topic and/or area that may be of interest to the user. For example, the machine learning model may be trained to predict or recommend one or more content indicators based on one or more responses to the questionnaire. The machine learning model may be trained using a set of observations. The set of observations may be obtained from training data (e.g., historical data), such as response data gathered during one or more processes described herein. The machine learning system may apply a trained machine learning model to the new observation to generate an output (e.g., a result). The type of output may depend on the type of machine learning model and/or the type of machine learning task being performed. For example, the output may include a predicted value of a target variable, such as when supervised learning is employed (e.g., a content indicator). Additionally, or alternatively, the output may include information that identifies a cluster to which the new observation belongs and/or information that indicates a degree of similarity between the new observation and one or more other observations, such as when unsupervised learning is employed.

Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, one or more content indicators associated with the user data and/or one or more recommended resources associated with the user data (e.g., where the one or more recommended resources are associated with the one or more content indicators). The first automated action may include, for example, obtaining or identifying one or more recommended resources from the set of resources stored by the recommendation device. In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model may be re-trained using feedback information. For example, feedback may be provided to the machine learning model. The feedback may be associated with actions performed based on the recommendations provided by the trained machine learning model and/or automated actions performed, or caused, by the trained machine learning model. In other words, the recommendations and/or actions output by the trained machine learning model may be used as inputs to re-train the machine learning model (e.g., a feedback loop may be used to train and/or update the machine learning model). For example, the feedback information may include the interaction information described in more detail elsewhere herein. For example, the trained machine learning model may be re-trained using an indication of a level of interaction with resources that are provided to the user based on the recommendation(s) of the trained machine learning model. In this way, the machine learning system may apply a rigorous and automated process to determine, identify, and/or recommend resources based on one or more responses to the questionnaire. The machine learning system may enable recognition and/or identification of tens, hundreds, thousands, or millions of features and/or feature values for tens, hundreds, thousands, or millions of observations, thereby increasing accuracy and consistency and reducing delay associated with determining, identifying, and/or recommending resources based on one or more responses to the questionnaire relative to requiring computing resources to be allocated for tens, hundreds, or thousands of operators to manually determine, identify, and/or recommend resources based on one or more responses to the questionnaire using the features or feature values.

The recommendation device may identify, based on the one or more content indicators and from the set of resources, the one or more recommended resources. For example, the relevant content provided in response to the user data may include content associated with the one or more content indicators. In some implementations, the recommendation device may search the library (e.g., that includes the set of resources) using the one or more content indicators. This enables the recommendation device to quickly identify resource(s) that include or provide relevant content for the user based on the one or more responses to the questionnaire.

As shown by reference number 130, the recommendation device may provide, and the user device may obtain (e.g., via one or more API communications), the one or more recommended resources (e.g., via the private session). For example, the recommendation device and/or the user device may provide, via the private session, access to the one or more recommended resources. In some implementations, the recommendation device may provide, for display via a user interface, the one or more recommended resources. For example, the user device may display a user interface (e.g., associated with the navigation platform and/or the private session). The user interface may enable the user to access, search, and/or navigate between the one or more recommended resources.

In some implementations, the recommendation device may provide the one or more recommended resources (e.g., the user device may download or otherwise obtain the one or more recommended resources from the recommendation device or another device). In some implementations, the recommendation device may provide navigation instructions to enable the user device to navigate to the one or more recommended resources. For example, the recommendation device may indicate a location (e.g., a website, a page, or a storage location) at which the one or more recommended resource can be accessed and/or obtained. The user device may obtain the one or more recommended resources based on the navigation instructions.

As shown by reference number 135, the user device may display, via the private session, the one or more recommended resources. For example, the user device may display the one or more recommended resources via the user interface (e.g., that is associated with the navigation platform). The user interface may be the same user interface that is used to obtain the one or more responses to the questionnaire (e.g., as described in connection with FIG. 1A). In other implementations, the user interface may be a different user interface than the user interface that is used to obtain the one or more responses to the questionnaire.

Figure 1C:
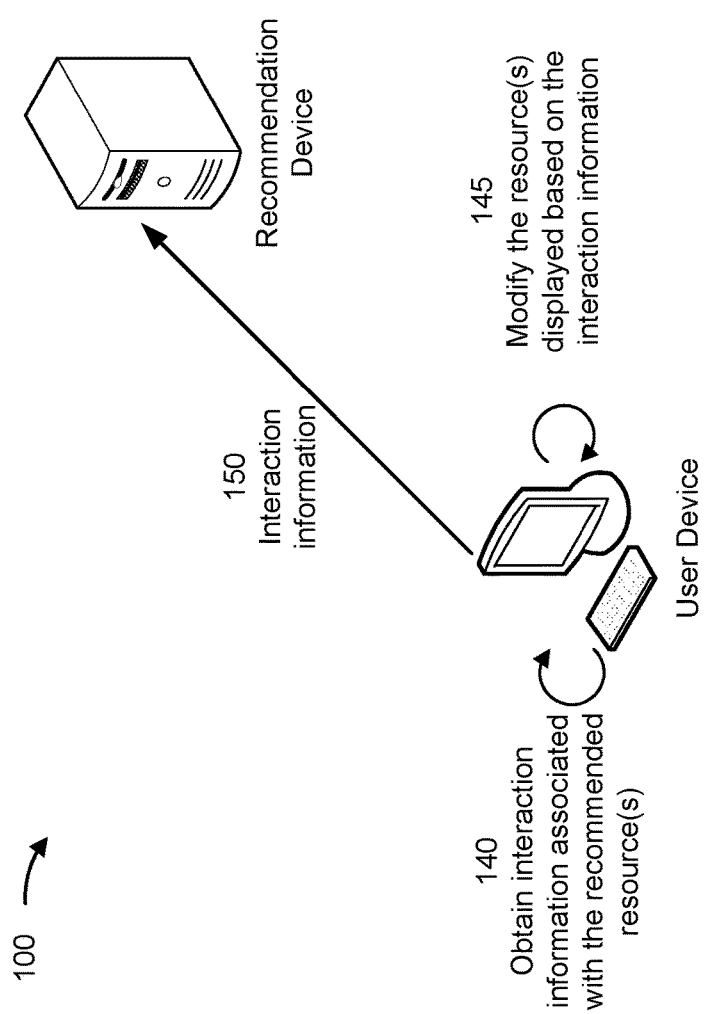

As shown in FIG. 1C, and by reference number 140, the user device may obtain interaction information associated with the one or more recommended resources. For example, the interaction information may indicate one or more interactions with the one or more recommended resources (e.g., via the user interface and/or the navigation platform). An interaction (e.g., a user interaction) may include a click (e.g., a click of a button, link, or other interactive element on the user interface), a scroll (e.g., scrolling behavior, such as how far a scroll is on a page or within a specific area), a mouse movement (e.g., movements of a cursor, mouse, or other input element associated with the user interface and/or user device, including speed, path, and/or pattern of the movements), a keyboard input, a form submission (e.g., capturing data entered into a form or field, such as a search field of the user interface), a hover (e.g., tracking an amount of time spent "hovering" over an element or page), a time spent on a page or resource, a view count (e.g., for a specific page or resource), a download (e.g., indicating a resource downloaded by the user device in response to a user input), a media interaction (e.g., an interaction with a media element, such as video play/pause, volume adjustments, and/or seeking), a gestural interaction (e.g., a swipe, pinch, tap, and/or other gestural interaction), a device orientation, and/or a network activity interaction (e.g., a loading of one or more external resources, an API call, or another network interaction), among other examples.

In some implementations, the user device may track interactions with the one or more recommended resources during the private session. For example, the user device may track one or more interactions associated with the user interface and/or the navigation platform to generate the interaction information. In some implementations, the user device may obtain, via the private session, interaction information associated with one or more interactions with the one or more recommended resources via the private browser. The interaction information may indicate one or more resources and/or one or more elements or parts of a given resource that are interacted with by the user. This may provide additional information and/or provide additional insights regarding the topic or area associated with the questionnaire. For example, the interaction information may indicate content that is of interest to the user (e.g., based on the content that is interacted with via the private session, the navigation platform, and/or the user device).

In some implementations, as shown by reference number 145, the user device may modify one or more resources being displayed based on the interaction information. For example, the user device may provide, for display via the user interface, a first one or more resources from the one or more recommended resources. The user device may obtain, via the user interface and the private session, an indication of an interaction with at least one resource from the first one or more resources. The user device may provide, for display via the user interface, a second one or more resources, from the one or more recommended resources, that are based on the interaction with the at least one resource. For example, the user device may refine the recommended resources displayed based on the interactions with other resources displayed by the user interface. For example, a given resource may include an interactive element associated with a sub-topic or area of interest (e.g., associated with the second one or more resources). The interaction may be associated with selecting the interactive element.

As another example, a portion or a page of a resource may be associated with a sub-topic or area of interest. The interaction may be associated with the portion or the page (e.g., one or more clicks, scrolls, or other interactions with the portion or the page). For example, the interaction may indicate than an amount of time for which the user interface displays or is navigated to the portion or the page satisfies a time threshold. The second one or more resources may be associated with the sub-topic or area of interest. In other words, based on a user viewing and/or interacting with a portion of a resource that is associated with a sub-topic or area of interest, the user device may recommend additional resources associated with the sub-topic or area of interest.

As shown by reference number 150, the user device may provide, and the recommendation device may obtain, the interaction information. For example, the recommendation device may obtain, via the private session and/or from the user device, the interaction information associated with one or more interactions with the one or more recommended resources via the private browser (e.g., via the navigation platform executing on the user device). The interaction information may indicate types of interactions, data of interactions (e.g., a quantity of clicks, an amount of time spent viewing a page or resource, or other data), and/or resources that were interacted with, among other examples.

Figure 1D:
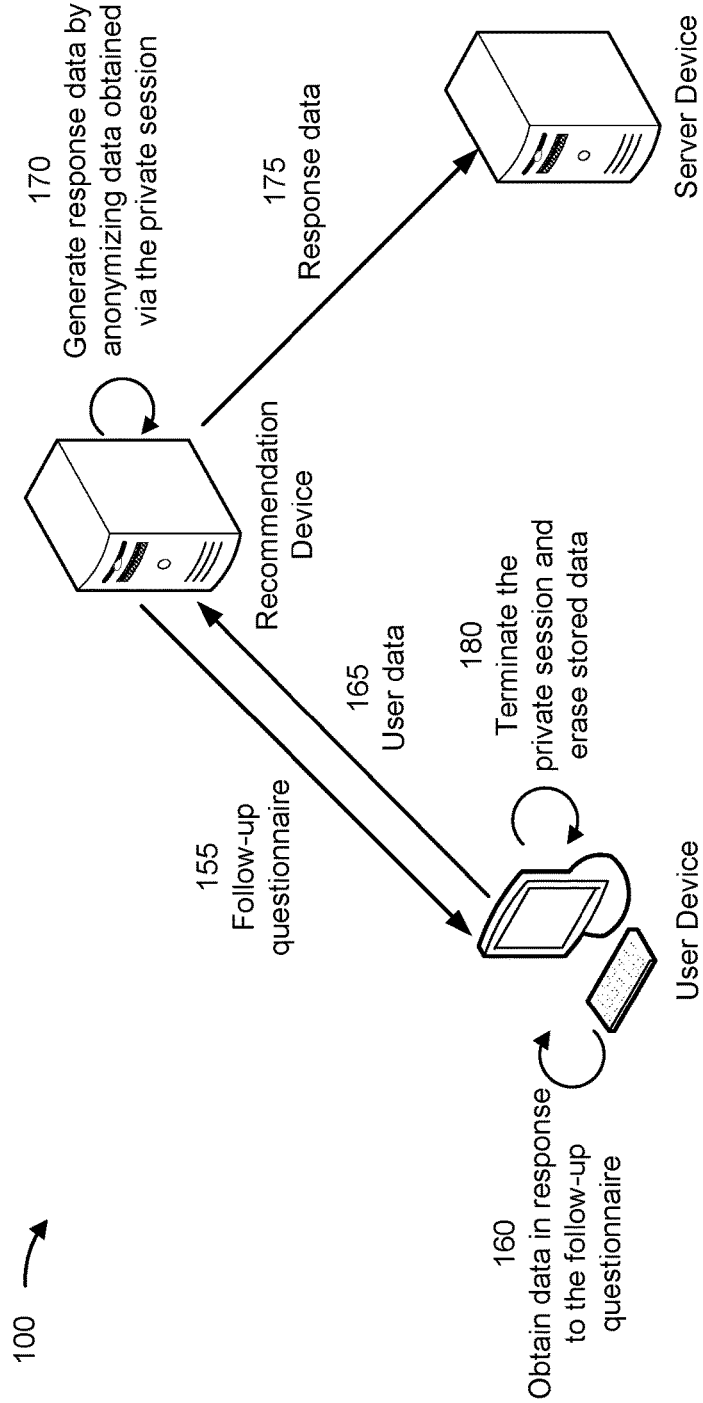

As shown in FIG. 1D, and by reference number 155, the recommendation device may provide, and the user device may obtain, a follow-up questionnaire (e.g., to the questionnaire). The follow-up questionnaire may also be referred to as a secondary questionnaire herein. For example, the recommendation device may generate, based on the interaction information, a follow-up questionnaire to the questionnaire. The follow-up questionnaire may indicate one or more prompts (and/or questions) that are based on content accessed via the private session and the one or more recommended resources. For example, the follow-up questionnaire may include one or more prompts and/or questions that are associated with a topic, area of interest, and/or are otherwise associated with content accessed via the private session and via the user device. The recommendation device may provide, for display, the follow-up questionnaire via the private session.

As shown by reference number 160, the user device may obtain data (e.g., user data) in response to the follow-up questionnaire. For example, the user device may obtain one or more inputs to a user interface (e.g., the user interface described above or a different user interface). The one or more inputs may indicate one or more responses to the follow-up questionnaire. The user device may collect the one or more responses to generate the user data. In some implementations, the user device may obtain the one or more responses via the private session, as described in more detail elsewhere herein. The user device may obtain, via a browser or application associated with the private session (e.g., the navigation platform), the one or more responses to the follow-up questionnaire. In other examples, the user device may obtain the one or more responses to the follow-up questionnaire via another session (e.g., other than the private session).

As shown by reference number 165, the user device may provide, and the recommendation device may obtain, additional data (e.g., additional user data) indicating a second one or more responses (e.g., the one or more responses to the follow-up questionnaire). The additional user data (e.g., also referred to as secondary data herein) may be provided in association with the questionnaire (e.g., in response to the questionnaire). The additional user data may improve an accuracy and/or a utility of response data associated with the questionnaire. For example, providing the follow-up questionnaire after providing access to the one or more recommended resources may improve an accuracy of data collected via the questionnaire. As an example, a first one or more responses to the questionnaire (e.g., associated with a given topic or area of interest) may be provided in response to the questionnaire. The recommendation device may enable access (via the private session) to one or more resources associated with a given topic or area of interest. The content indicated by the one or more resources may cause information indicated by the first one or more responses to change. For example, a user may have been aware of the content and/or the content may change the user's understanding and/or opinion.

As a result, the additional user data may improve the accuracy of data collected as part of the questionnaire. For example, without the additional user data, the survey data may only indicate the first one or more responses. As a result, the server device (or another device) may consume processing resources, computing resources, and/or memory resources, among other examples, analyzing response data that is based on the first one or more responses and/or performing one or more actions based on the analysis. By collecting the additional user data after providing access to the one or more recommended resources, the response data analyzed by the server device (or another device) may provide more insightful and/or more accurate information.

In some implementations, the user device may maintain the private session. For example, the user device and/or the recommendation device may detect that the navigation platform (e.g., private browser) has been closed via the user device. The user device and/or the recommendation device may maintain, based on detecting that the private browser has been closed, browsing data via local storage associated with the navigation platform (e.g., private browser). For example, the browsing data may include the interaction information and/or other data associated with resources that were accessed via the private session. The user device and/or the recommendation device may detect that the navigation platform (e.g., the private browser) has been opened via the user device. The user device and/or the recommendation device may provide, based on maintaining the browsing data, resumed access to the one or more recommended resources via the private browser. In some implementations, providing the resumed access may include indicating one or more interactions. For example, the user device may provide, for display, an indication of previous interactions with the one or more recommended resources (e.g., an indication of a page, element, or other portion of a resource that was previously interacted with via the private session). The may enable the user device to revisit previous sessions (or initiate a new session) for ongoing support associated with the questionnaire. By combining the machine learning-generated immediate recommended resources with the interactive system for exploration of the recommended resources, the user device may be enabled to display instant results and resources based on one or more questionnaire responses. The recommendation device may provide initial recommendations for resources to access, while the interactive user interface may enable users to navigate to resources associated with specific topics of interest, providing a more personalized and tailored experience for addressing responses to the questionnaire.

As shown by reference number 170, the recommendation device may generate response data by anonymizing data obtained via the private session. For example, the response data may include the user data (e.g., indicating the one or more responses to the questionnaire), the interaction information, and/or the additional user data (e.g., indicating the one or more responses to the follow-up questionnaire), among other data collected and/or obtained via the private session. The recommendation device may anonymize the response data. For example, the recommendation device may perform data masking, data pseudonymization, data generalization, data swapping, and/or another operation to anonymize the response data. In some implementations, the recommendation device may generate the response data in response to a termination of the private session.

As shown by reference number 175, the recommendation device may provide, and the server device may obtain, the response data. For example, the recommendation device may provide the response data to the server device (e.g., via a session or communication link that is different than the private session). In other implementations, the user device (rather than the recommendation device) may generate and/or provide the response data to the server device in a similar manner as described herein.

As shown by reference number 180, the user device may terminate the private session and erase or remove stored data associated with the private session. For example, the user device may obtain an indication to end the private session. The user device may cause, based on obtaining the indication to end the private session, the user data, and the interaction information to be cleared from a local storage of the navigation platform (e.g., the private browser). In other words, after the private session is terminated, the user device may cause all data (e.g., the user data, the interaction information, and/or the additional user data) to be erased, removed, cleared, and/or otherwise deleted from memory of the user device and/or the navigation platform. In other words, data associated with the private session may only be maintained while the private session is active. This may improve a privacy and/or security of the data because the data is not permanently stored in a manner that can link or otherwise associate the data with a particular user (e.g., in a non-anonymized manner).

As a result, the techniques and implementations described herein enable personalized resources to be provided to the user device in response to the user data (e.g., indicating one or more responses to a questionnaire) while also ensuring the privacy of the user data. For example, all browsing history, cookies, cached files, and/or other temporary data associated with the private session may be stored locally (e.g., in a browser memory or other storage of a navigation platform) by the user device. After the private session is ended, the browsing history, cookies, cached files, and/or other temporary data associated with the private session may be deleted. Additionally, by providing access to the one or more resources via the private session in response to the user data, personalized resources may be displayed for a user shortly after the user provides the one or more responses. This improves access to relevant content for the user and reduces an amount of time between the user providing the one or more responses and obtaining access to the one or more resources. Additionally, be enabling the recommendation device to provide the one or more resources via the private session in response to the user data, the recommendation device may conserve computing resources, processing resources, memory resources, and/or time, among other examples, that would have otherwise been used to collect anonymized response data, analyze the response data, determine one or more areas to be addressed, and/or perform one or more actions to address the one or more areas (e.g., to provide access to resource(s) associated with the one or more areas, among other examples, where the one or more areas are not relevant for the user).

As indicated above, FIGS. 1A-1D are provided as an example. Other examples may differ from what is described with regard to FIGS. 1A-1D.

Figure 2:
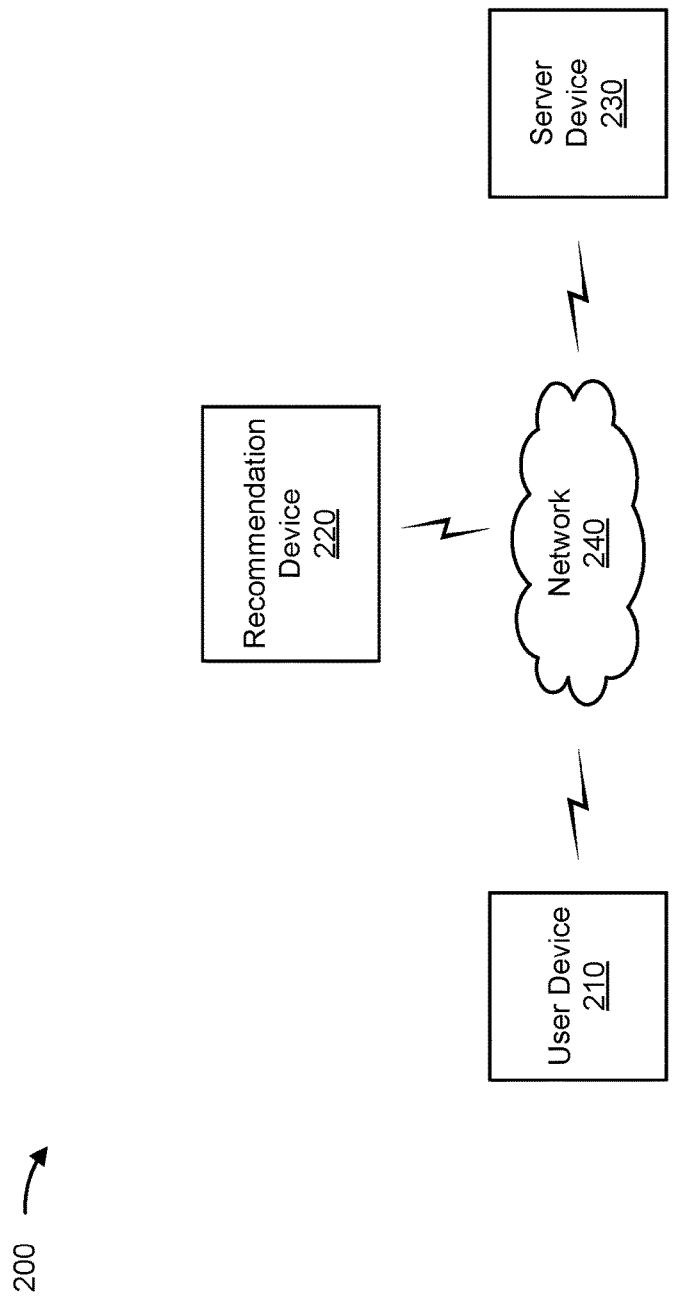
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a recommendation device 220, a server device 230, and a network 240. Devices of environment 200 may interconnect via wired connections, wireless connections, or a combination of wired and wireless connections.

The user device 210 may include one or more devices capable of receiving, generating, storing, processing, and/or providing information associated with enhanced data privacy and recommendations (e.g., for questionnaire data), as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The recommendation device 220 may include one or more devices capable of receiving, generating, storing, processing, providing, and/or routing information associated with enhanced data privacy and recommendations (e.g., for questionnaire data), as described elsewhere herein. The recommendation device 220 may include a communication device and/or a computing device. For example, the recommendation device 220 may include a server, such as an application server, a client server, a web server, a database server, a host server, a proxy server, a virtual server (e.g., executing on computing hardware), or a server in a cloud computing system. In some implementations, the recommendation device 220 may include computing hardware used in a cloud computing environment.

The server device 230 may include one or more devices capable of receiving, generating, storing, processing, providing, and/or routing information associated with enhanced data privacy and recommendations (e.g., for questionnaire data), as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
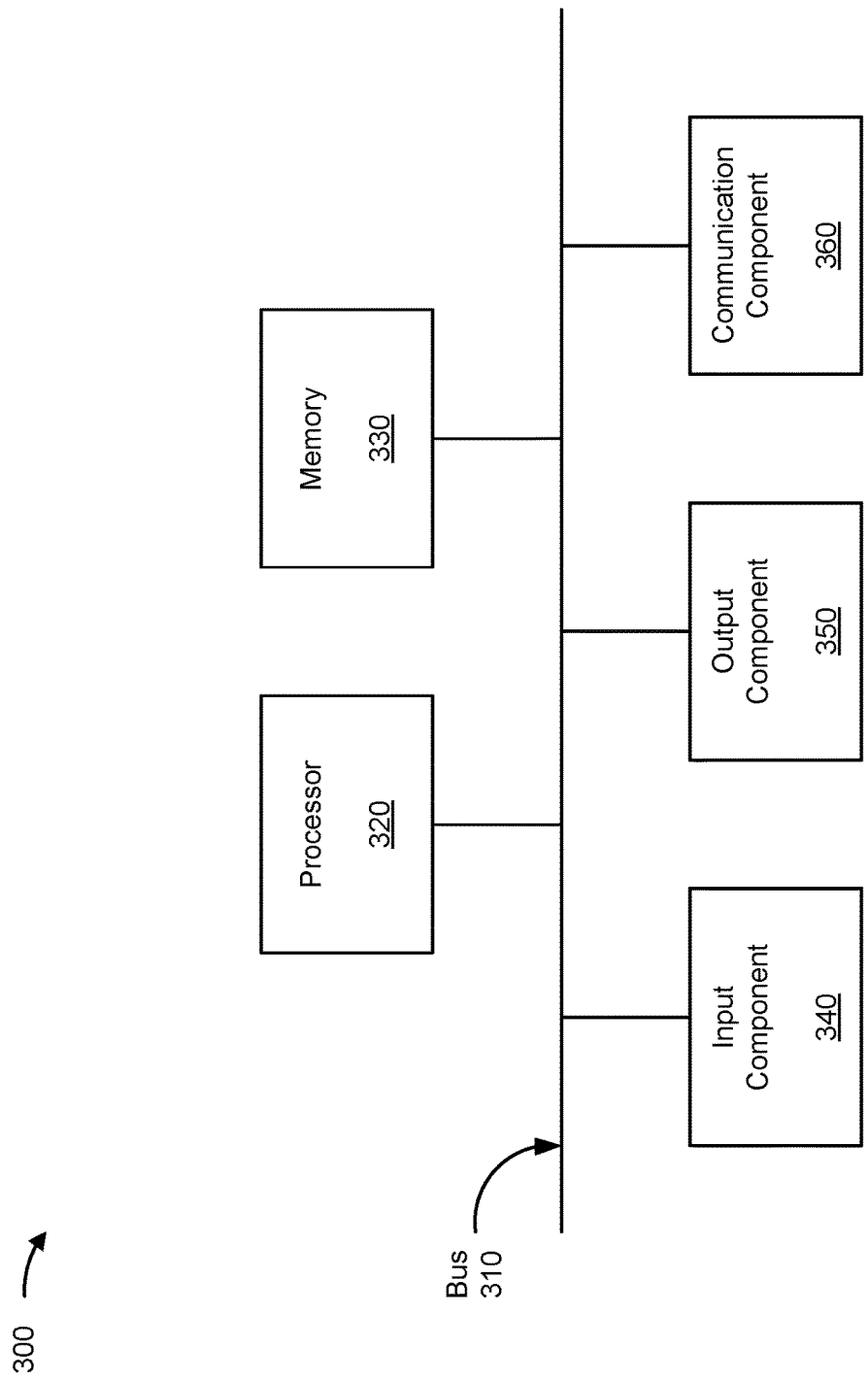
FIG. 3 is a diagram of example components of a device associated with enhanced data privacy and recommendations, in accordance with some embodiments of the present disclosure.

FIG. 3 is a diagram of example components of a device 300 associated with enhanced data privacy and recommendations. The device 300 may correspond to the user device 210, the recommendation device 220, and/or the server device 230. In some implementations, the user device 210, the recommendation device 220, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
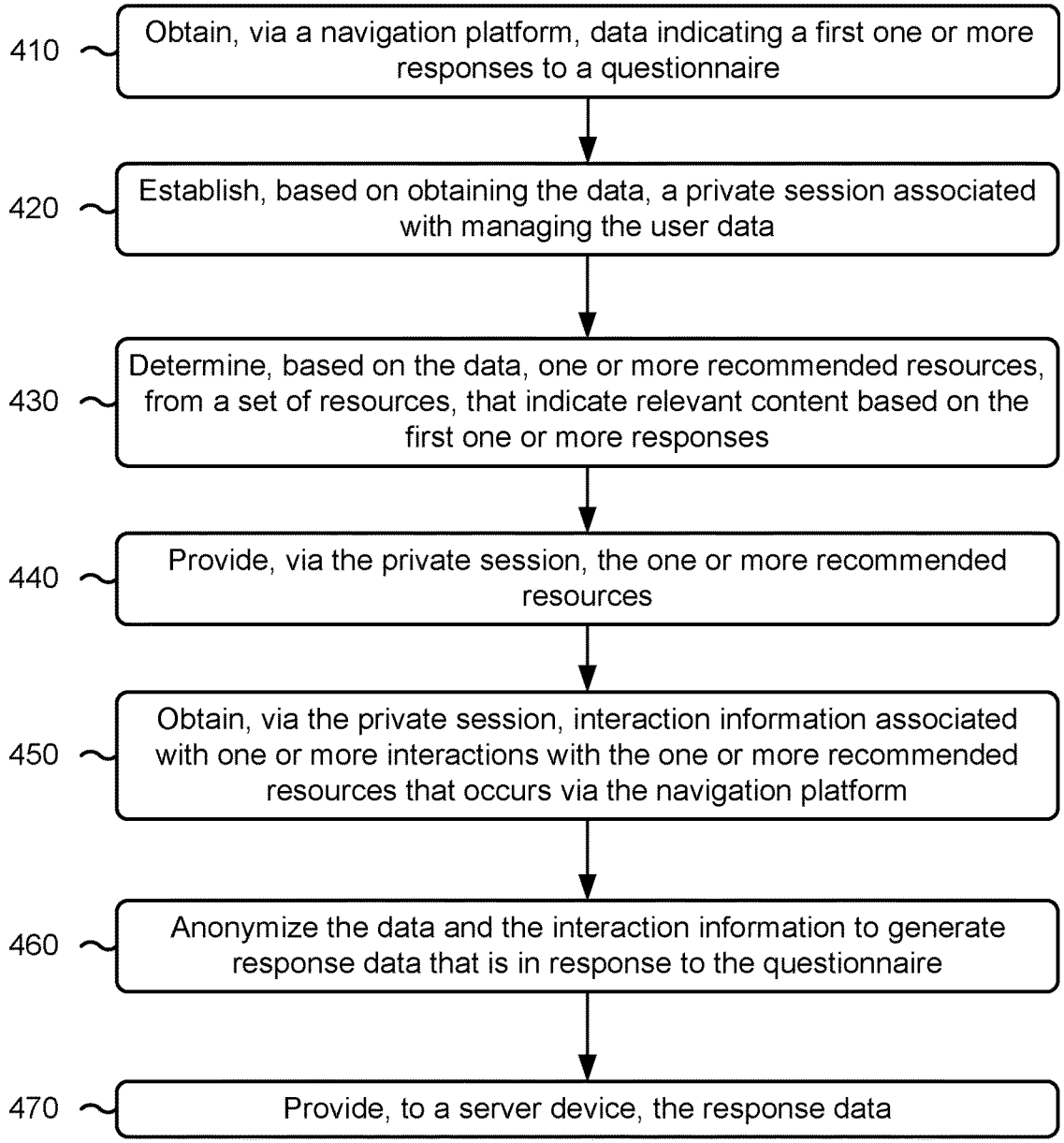
FIG. 4 is a flowchart of an example process associated with enhanced data privacy and recommendations, in accordance with some embodiments of the present disclosure.

FIG. 4 is a flowchart of an example process 400 associated with enhanced data privacy and recommendations. In some implementations, one or more process blocks of FIG. 4 may be performed by the recommendation device 220. In some implementations, one or more process blocks of FIG. 4 may be performed by another device or a group of devices separate from or including the recommendation device 220, such as the user device 210 and/or the server device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining, via a navigation platform, data indicating a first one or more responses to a questionnaire (block 410). For example, the recommendation device 220 (e.g., using processor 320 and/or memory 330) may obtain, via a navigation platform, data indicating a first one or more responses to a questionnaire, as described above in connection with reference number 115 of FIG. 1A. As an example, the navigation platform may be a browser (e.g., a web browser), an application, and/or another platform that enables the questionnaire to be displayed (e.g., via the user device 210).

As further shown in FIG. 4, process 400 may include establishing, based on obtaining the data, a private session associated with managing the data, wherein the private session is identified using an identifier of the navigation platform (block 420). For example, the recommendation device 220 (e.g., using processor 320 and/or memory 330) may establish, based on obtaining the data, a private session associated with managing the data, wherein the private session is identified using an identifier of the navigation platform, as described above in connection with reference number 120 of FIG. 1A. As an example, the private session may enable secure and/or private communication between the recommendation device 220 and the user device 210. The private session may be a restricted and/or isolated browsing or computer environment that is designed to keep the user's activity and data separate from a main or default session of the navigation platform.

As further shown in FIG. 4, process 400 may include determining, based on the data, one or more recommended resources, from a set of resources, that indicate relevant content based on the first one or more responses (block 430). For example, the recommendation device 220 (e.g., using processor 320 and/or memory 330) may determine, based on the data, one or more recommended resources, from a set of resources, that indicate relevant content based on the first one or more responses, as described above in connection with reference number 125 of FIG. 1B. As an example, the recommendation device 220 may determine one or more content indicators (e.g., associated with a topic, area, and/or category of content) that may be relevant based on the data (e.g., the data indicating the one or more responses to the questionnaire). The recommendation device 220 may identify, from the set of resources and based on the one or more content indicators, the one or more recommended resources.

As further shown in FIG. 4, process 400 may include providing, via the private session, the one or more recommended resources (block 440). For example, the recommendation device 220 (e.g., using processor 320 and/or memory 330) may provide, via the private session, the one or more recommended resources, as described above in connection with reference number 130 of FIG. 1B. As an example, the recommendation device 220 may enable the one or more recommended resources to be accessed via the user device 210 and the private session.

As further shown in FIG. 4, process 400 may include obtaining, via the private session, interaction information associated with one or more interactions with the one or more recommended resources that occur via the navigation platform (block 450). For example, the recommendation device 220 (e.g., using processor 320 and/or memory 330) may obtain, via the private session, interaction information associated with one or more interactions with the one or more recommended resources that occur via the navigation platform, as described above in connection with reference number 150 of FIG. 1C. As an example, the interaction information may indicate information associated with one or more interactions with the one or more recommended resources, such as one or more clicks, one or more page views, one or more gestural interactions, and/or one or more page view time indications (e.g., indicating an amount of time for which a resource or a page of a resource is displayed), among other examples.

As further shown in FIG. 4, process 400 may include anonymizing the data and the interaction information to generate response data that is in response to the questionnaire (block 460). For example, the recommendation device 220 (e.g., using processor 320 and/or memory 330) may anonymize the data and the interaction information to generate response data that is in response to the questionnaire, as described above in connection with reference number 170 of FIG. 1D. As an example, the recommendation device 220 may generate the response data (e.g., that include the data indicating the one or more responses and the interaction information with the provided resource(s)) and anonymize the response data to enable the response data to be shared outside of the private session without identifying a user associated with the response data.

As further shown in FIG. 4, process 400 may include providing, to a server device, the response data (block 470). For example, the recommendation device 220 (e.g., using processor 320 and/or memory 330) may provide, to a server device, the response data, as described above in connection with reference number 175 of FIG. 1D. As an example, the server device may be associated with an entity that is associated with the questionnaire. For example, the recommendation device 220 may provide the response data to the server device outside of the private session.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

Figure 5:
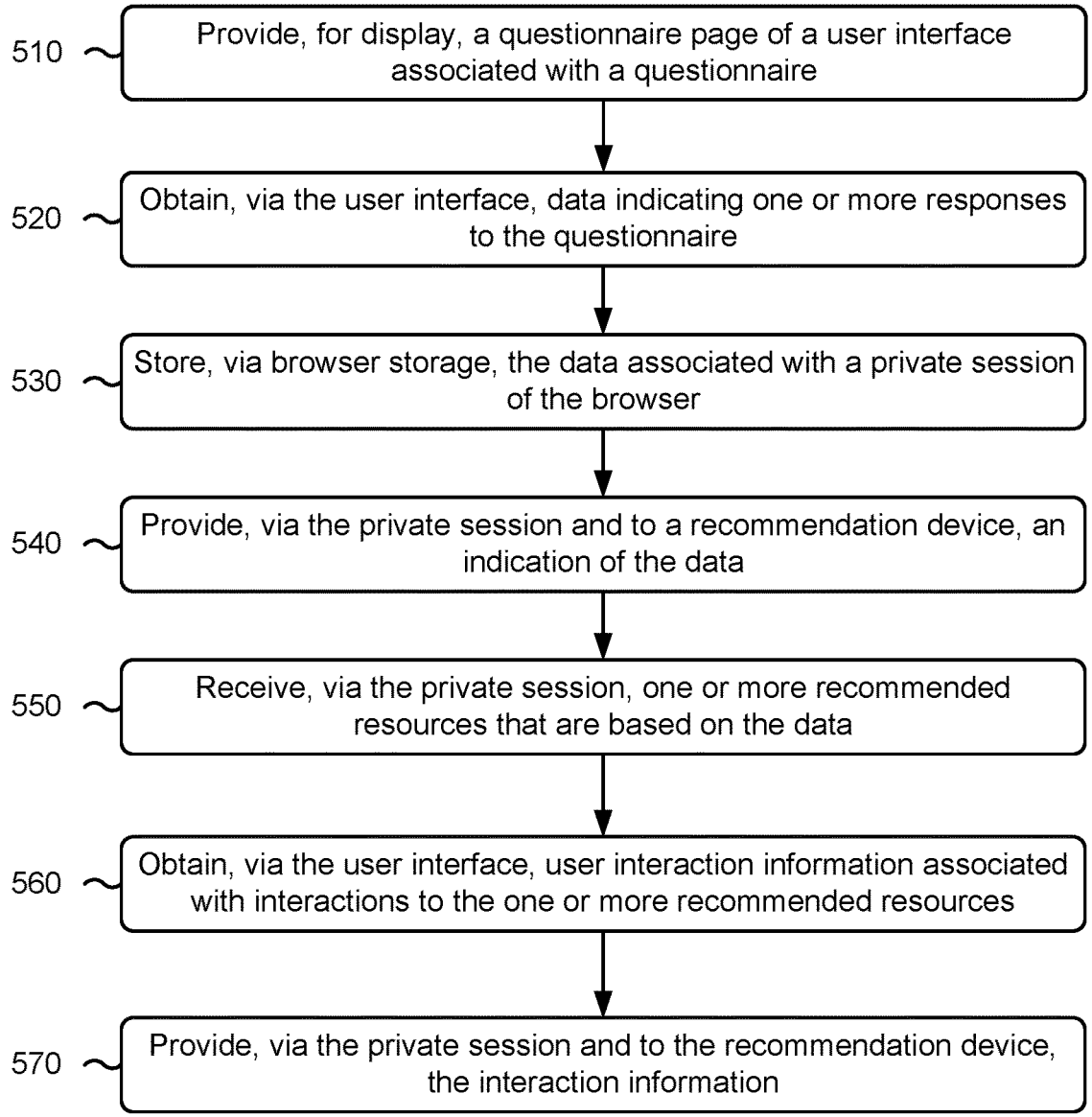
FIG. 5 is a flowchart of an example process associated with enhanced data privacy and recommendations, in accordance with some embodiments of the present disclosure.

FIG. 5 is a flowchart of an example process 500 associated with enhanced data privacy and recommendations. In some implementations, one or more process blocks of FIG. 5 may be performed by the user device 210. In some implementations, one or more process blocks of FIG. 5 may be performed by another device or a group of devices separate from or including the user device 210, such as the recommendation device 220 and/or the server device 230. Additionally, or alternatively, one or more process blocks of FIG. 5 may be performed by one or more components of the device 300, such as processor 320, memory 330, input component 340, output component 350, and/or communication component 360.

As shown in FIG. 5, process 500 may include providing, for display, a questionnaire page of a user interface associated with a questionnaire (block 510). For example, the user device 210 (e.g., using processor 320 and/or memory 330) may provide, for display, a questionnaire page of a user interface associated with a questionnaire, as described above in connection with reference number 105 of FIG. 1A. In some implementations, the user interface is displayed via a browser executing on the user device 210.

As further shown in FIG. 5, process 500 may include obtaining, via the user interface, data indicating one or more responses to the questionnaire (block 520). For example, the user device 210 (e.g., using processor 320 and/or memory 330) may obtain, via the user interface, data indicating one or more responses to the questionnaire, as described above in connection with reference number 110 of FIG. 1A. As an example, the user device 210 may obtain one or more user inputs to the user interface indicating the one or more responses to the questionnaire.

As further shown in FIG. 5, process 500 may include storing, via browser storage, the data associated with a private session of the browser (block 530). For example, the user device 210 (e.g., using processor 320 and/or memory 330) may store, via browser storage, the data associated with a private session of the browser, as described above in connection with FIG. 1A. As an example, the user device 210 may store user data, browsing history, interaction information, and/or any other data generated, obtained, and/or communicated via the private session via private and/or temporary browser storage (e.g., local storage or web storage) of a browser (e.g., the private browser).

As further shown in FIG. 5, process 500 may include providing, via the private session and to a recommendation device, an indication of the data (block 540). For example, the user device 210 (e.g., using processor 320 and/or memory 330) may provide, via the private session and to a recommendation device, an indication of the data, as described above in connection with reference number 115 of FIG. 1A. As an example, the user device may provide an indication of the data via an API call.

As further shown in FIG. 5, process 500 may include receiving, via the private session, one or more recommended resources that are based on the data (block 550). For example, the user device 210 (e.g., using processor 320, memory 330, input component 340, and/or communication component 360) may receive, via the private session, one or more recommended resources that are based on the data, as described above in connection with reference number 130 of FIG. 1B. As an example, the user device 210 may obtain information that enables the user device 210 to provide access to the one or more resources via the user interface and/or the private browser.

As further shown in FIG. 5, process 500 may include obtaining, via the user interface, user interaction information associated with interactions to the one or more recommended resources (block 560). For example, the user device 210 (e.g., using processor 320 and/or memory 330) may obtain, via the user interface, user interaction information associated with interactions to the one or more recommended resources, as described above in connection with reference number 140 of FIG. 1C. As an example, the interaction information may indicate information associated with one or more interactions with the one or more recommended resources, such as one or more clicks, one or more page views, one or more gestural interactions, and/or one or more page view time indications (e.g., indicating an amount of time for which a resource or a page of a resource is displayed), among other examples.

As further shown in FIG. 5, process 500 may include providing, to the recommendation device, the interaction information (block 570). For example, the user device 210 (e.g., using processor 320 and/or memory 330) may provide, to the recommendation device, the interaction information, as described above in connection with reference number 150 of FIG. 1C. As an example, the user device 210 may provide the interaction information to enable the recommendation device to include the interaction information in anonymized response data to the questionnaire.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing data privacy and recommendations, the system comprising:
   one or more memories; and
   one or more processors, communicatively coupled to the one or more memories, configured to:
     obtain, via a private browser, user data indicating a first one or more responses;
     establish, based on obtaining the user data, a private session associated with managing the user data, wherein the private session is identified using an identifier of the private browser, and wherein browsing data associated with the private session is locally stored via the private browser;
     determine, based on the user data, one or more recommended resources that indicate relevant content that is based on the first one or more responses;
     provide, via the private session, access to the one or more recommended resources;
     obtain, via the private session, interaction information associated with one or more interactions with the one or more recommended resources via the private browser;
     generate response data that indicates the user data and the interaction information, wherein the response data is anonymized; and
     provide, to a server device and via another session, the response data.

2. The system of claim 1, wherein the one or more processors, to determine the one or more recommended resources, are configured to:
- determine, using a machine learning model, one or more content indicators associated with a user based on the first one or more responses, wherein the one or more responses are provided by the user; and
- identify, based on the one or more content indicators and from a set of resources, the one or more recommended resources,
  - wherein the relevant content includes content associated with the one or more content indicators.

3. The system of claim 1, wherein the one or more processors are further configured to:
- detect that the private browser has been closed via a user device;
- maintain, based on detecting that the private browser has been closed, the browsing data via local storage associated with the private browser;
- detect that the private browser has been opened via the user device; and
- provide, based on maintaining the browsing data, resumed access to the one or more recommended resources via the private browser, wherein providing the resumed access includes indicating the one or more interactions.

4. The system of claim 1, wherein the one or more processors are further configured to:
- obtain an indication to end the private session; and
- cause, based on obtaining the indication to end the private session, the user data and the interaction information to be cleared from a local storage of the private browser.

5. The system of claim 1, wherein the first one or more responses are associated with a questionnaire, wherein the questionnaire is provided by an entity, wherein the server device is associated with the entity, and wherein the response data includes a questionnaire response associated with the questionnaire.

6. The system of claim 1, wherein the first one or more responses are in response to a questionnaire, and wherein the one or more processors are further configured to:
- generate, based on the interaction information, a follow-up questionnaire, to the questionnaire, indicating one or more prompts that are based on content accessed via the private session and the one or more recommended resources; and
- provide, for display, the follow-up questionnaire via the private session.

7. The system of claim 6, wherein the one or more processors are further configured to:
- obtain, based on providing the follow-up questionnaire, additional user data indicating a second one or more responses,
  - wherein the response data indicates the additional user data.

8. The system of claim 1, wherein the one or more recommended resources include at least one of:
- a web page,
- an article,
- a message,
- contact information, or
- training content.

9. A method for providing data privacy and recommendations, comprising:
- obtaining, by a device and via a navigation platform, data indicating a first one or more responses to a questionnaire;
- establishing, by the device and based on obtaining the data, a private session associated with managing the data, wherein the private session is identified using an identifier of the navigation platform;
- determining, by the device and based on the data, one or more recommended resources, from a set of resources, that indicate relevant content based on the first one or more responses;
- providing, by the device and via the private session, the one or more recommended resources;
- obtaining, by the device and via the private session, interaction information associated with one or more interactions with the one or more recommended resources that occur via the navigation platform;
- anonymizing, by the device, the data and the interaction information to generate response data that is in response to the questionnaire; and
- providing, by the device and to a server device, the response data.

10. The method of claim 9, wherein determining the one or more recommended resources comprises:
- determining one or more content indicators associated with the first one or more responses; and
- identifying, based on the one or more content indicators, the one or more recommended resources,
  - wherein the relevant content is associated with the one or more content indicators.

11. The method of claim 9, further comprising:
- providing, for display, a user interface associated with the questionnaire,
  - wherein the data is obtained via the user interface, and
  - wherein providing the one or more recommended resources comprises:
    - providing, for display via the user interface, the one or more recommended resources.

12. The method of claim 9, wherein the data, the interaction information, and any browsing data generated via the private session are stored locally via the navigation platform.

13. The method of claim 9, wherein the data is associated with a user, and wherein establishing the private session comprises:
- establishing multiple private sessions associated with respective questionnaires including the questionnaire,
  - wherein the multiple private sessions are associated with separately maintaining respective data for the respective questionnaires.

14. The method of claim 9, wherein the first one or more responses are in response to a questionnaire, and wherein the method comprises:
- generating, based on the interaction information, a follow-up questionnaire, to the questionnaire, indicating one or more prompts that are based on content accessed via the private session and the one or more recommended resources;
- providing, for display, the follow-up questionnaire via the private session; and
- obtaining, based on providing the follow-up questionnaire, additional data indicating a second one or more responses to the follow-up questionnaire,
  - wherein the response data indicates the additional data.

15. A non-transitory computer-readable medium storing a set of instructions, the set of instructions comprising:
- one or more instructions that, when executed by one or more processors of a user device, cause the user device to:

provide, for display, a questionnaire page of a user interface associated with a questionnaire,
　　wherein the user interface is displayed via a browser executing on the user device;
obtain, via the user interface, data indicating one or more responses to the questionnaire;
store, via browser storage, the data associated with a private session of the browser;
provide, via the private session and to a recommendation device, an indication of the data;
receive, via the private session, one or more recommended resources that are based on the data;
obtain, via the user interface, user interaction information associated with interactions to the one or more recommended resources; and
provide, via the private session and to the recommendation device, the interaction information.

16. The non-transitory computer-readable medium of claim 15, wherein the interaction information is stored via the browser storage in connection with the private session, and wherein the one or more instructions, when executed by the one or more processors, further cause the user device to:
　　remove the data and the interaction information from the browser storage in response to a termination of the private session.

17. The non-transitory computer-readable medium of claim 15, wherein the browser storage is temporary storage maintained via the browser, and wherein the private session is maintained via the temporary storage over multiple uses of the browser.

18. The non-transitory computer-readable medium of claim 15, wherein the one or more instructions, when executed by the one or more processors, further cause the user device to:
　　provide, for display via the user interface, a first one or more resources from the one or more recommended resources;
　　obtain, via the user interface and the private session, an indication of an interaction with at least one resource from the first one or more resources; and
　　provide, for display via the user interface, a second one or more resources, from the one or more recommended resources, that are based on the interaction with the at least one resource.

19. The non-transitory computer-readable medium of claim 15, wherein the one or more instructions, when executed by the one or more processors, further cause the device to:
　　provide, for display via the user interface, a secondary questionnaire associated with the questionnaire,
　　　　wherein the secondary questionnaire includes one or more prompts that are based on the interaction information;
　　obtain, via the user interface, secondary data indicating one or more responses to the secondary questionnaire; and
　　provide, to a server device, the secondary data in association with the questionnaire.

20. The non-transitory computer-readable medium of claim 15, wherein the one or more recommended resources include at least one of:
　　a web page,
　　an article, or
　　a message.

\* \* \* \* \*